US008825912B2

(12) United States Patent
Lahti et al.

(10) Patent No.: US 8,825,912 B2
(45) Date of Patent: Sep. 2, 2014

(54) DYNAMIC STATE CONFIGURATION RESTORE

(75) Inventors: Gregg Lahti, Gilbert, AZ (US); Rodney Pesavento, Chandler, AZ (US); Joseph W. Triece, Phoenix, AZ (US); D. C. Sessions, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 12/564,493

(22) Filed: Sep. 22, 2009

(65) Prior Publication Data

US 2010/0121988 A1    May 13, 2010

Related U.S. Application Data

(60) Provisional application No. 61/113,779, filed on Nov. 12, 2008.

(51) Int. Cl.
  *G06F 3/00* (2006.01)
  *G06F 13/28* (2006.01)
  *G06F 13/12* (2006.01)

(52) U.S. Cl.
  CPC ............. *G06F 13/124* (2013.01); *G06F 13/28* (2013.01)
  USPC .................................... 710/9; 710/10; 710/26

(58) Field of Classification Search
  USPC .................................................. 710/9, 10, 26
  See application file for complete search history.

(56) References Cited

U.S. PATENT DOCUMENTS

| 6,247,079 B1* | 6/2001 | Papa et al. ..................... 710/302 |
| 6,877,063 B1* | 4/2005 | Allegrucci et al. ........... 711/102 |
| 6,954,879 B1 | 10/2005 | Tobias et al. ..................... 714/30 |
| 7,330,919 B2* | 2/2008 | Zhang et al. ..................... 710/72 |
| 7,930,535 B1* | 4/2011 | Reinbold ....................... 713/100 |
| 2003/0074495 A1 | 4/2003 | Lee et al. ........................ 710/10 |
| 2004/0039967 A1* | 2/2004 | Park ................................. 714/30 |
| 2008/0229000 A1* | 9/2008 | Kim ................................ 711/103 |
| 2009/0172253 A1* | 7/2009 | Rothman et al. .............. 711/103 |

OTHER PUBLICATIONS

International PCT Search Report, PCT/US2009/063998, 13 pages.

* cited by examiner

*Primary Examiner* — Zachary K Huson
(74) *Attorney, Agent, or Firm* — King & Spalding L.L.P.

(57) ABSTRACT

A microcontroller or integrated system has a bus, a plurality of peripheral devices each one coupled with the bus, a non-volatile memory, and a state machine coupled with the non-volatile memory and being operable to initialize the peripheral devices by reading initialization information from the non-volatile memory and writing it to the peripheral devices.

21 Claims, 4 Drawing Sheets

DYNAMIC STATE CONFIGURATION RESTORE

CROSS-REFERENCE TO RELATED APPLICATIONS

This application claims the benefit of U.S. Provisional Application No. 61/113,779 filed on Nov. 12, 2008, entitled "DYNAMIC STATE CONFIGURATION RESTORE", which is incorporated herein in its entirety.

TECHNICAL FIELD

The technical field of the present application relates to integrated systems having configurable devices and in particular to microprocessor systems, such as microcontrollers.

BACKGROUND

Integrated microprocessor systems, such as microcontrollers, comprise a plurality of peripheral devices that may require to be initialized to operate properly. These peripheral devices are generally coupled with the central processing unit (CPU) of the microcontroller via an internal bus, such as a peripheral device bus or a main coupling bus. The CPU is used to read and write data to and from these peripheral devices via the respective bus. During operation, a program which is executed by the CPU, might require a specific operation of one or more peripherals. To this end, the program generally initializes the respective control registers of the peripheral. Many programs require, thus, at start-up initialization of a plurality of peripheral devices. Conventional microcontrollers perform this initialization through the CPU which depending on the number of peripherals can be time consuming.

Furthermore, in many applications power consumption, in particular in mobile devices, is important. Thus, during a so-called sleep mode, only those parts of a microcontroller remain active that are necessary for a minimum power operation. In many cases this means that peripheral devices are turned off and their respective registers will, thus, lose all information. In conventional systems, the CPU needs, therefore, to first save all data from a peripheral that is necessary for its operation before it can be shut off and the system can enter a sleep mode. Once a sleep mode has been terminated, the CPU needs to restore all values of the peripheral devices previously saved. This process slows down entering and leaving a sleep mode. Hence, there exists a need for a more convenient way of initializing or restore peripheral values in a microcontroller.

SUMMARY

According to an embodiment, an integrated system may comprise a bus, a plurality of peripheral devices each one coupled with the bus, a non-volatile memory, and a state machine coupled with the non-volatile memory and being operable to initialize the peripheral devices by reading initialization information from the non-volatile memory and writing it to the peripheral devices.

According to a further embodiment, the non-volatile memory may be a Flash memory coupled with the bus. According to a further embodiment, the initialization information may comprise an address/data pair. According to a further embodiment, the initialization information may comprise an address/data sequence pair. According to a further embodiment, the state machine may be operable to write a plurality of data bytes/words to the address. According to a further embodiment, the integrated system may further comprise a CPU coupled with the bus. According to a further embodiment, the state machine can be operable to generate a signal to the CPU upon completion of initialization. According to a further embodiment, completion of initialization can be detected by the state machine by an invalid address stored in the non-volatile memory. According to a further embodiment, completion of initialization can be detected by the state machine by an invalid bit stored in the non-volatile memory. According to a further embodiment, the signal can be an interrupt. According to a further embodiment, the signal may release the CPU from reset. According to a further embodiment, the state machine can be implemented by a direct memory controller.

According to another embodiment, a method for initializing peripherals in an integrated system may comprise the steps of: a) resetting a non-volatile memory address; b) reading an initialization information from the non-volatile memory address by a state machine; c) determining validity of the initialization information; d) if valid, initializing a peripheral associated with the initialization information, incrementing the non-volatile memory address; and e) repeating steps b)-d).

According to a further embodiment, the initialization information may comprise an address/data pair. According to a further embodiment, the initialization information may comprise an address/data sequence pair. According to a further embodiment, the step of initializing may comprise writing a plurality of data bytes/words to the address. According to a further embodiment, the method may further comprise the step of generating a signal to a CPU upon completion of initialization. According to a further embodiment, completion of initialization can be detected by the state machine by an invalid address stored. According to a further embodiment, completion of initialization can be detected by the state machine by an invalid bit stored. According to a further embodiment, the signal can be an interrupt. According to a further embodiment, the signal may release the CPU from reset. According to a further embodiment, the method can be performed after exiting a sleep mode in which at least one peripheral is turned off. According to a further embodiment, the system may be a microcontroller and the method may be performed after a reset of the microcontroller.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

Figure 1A:
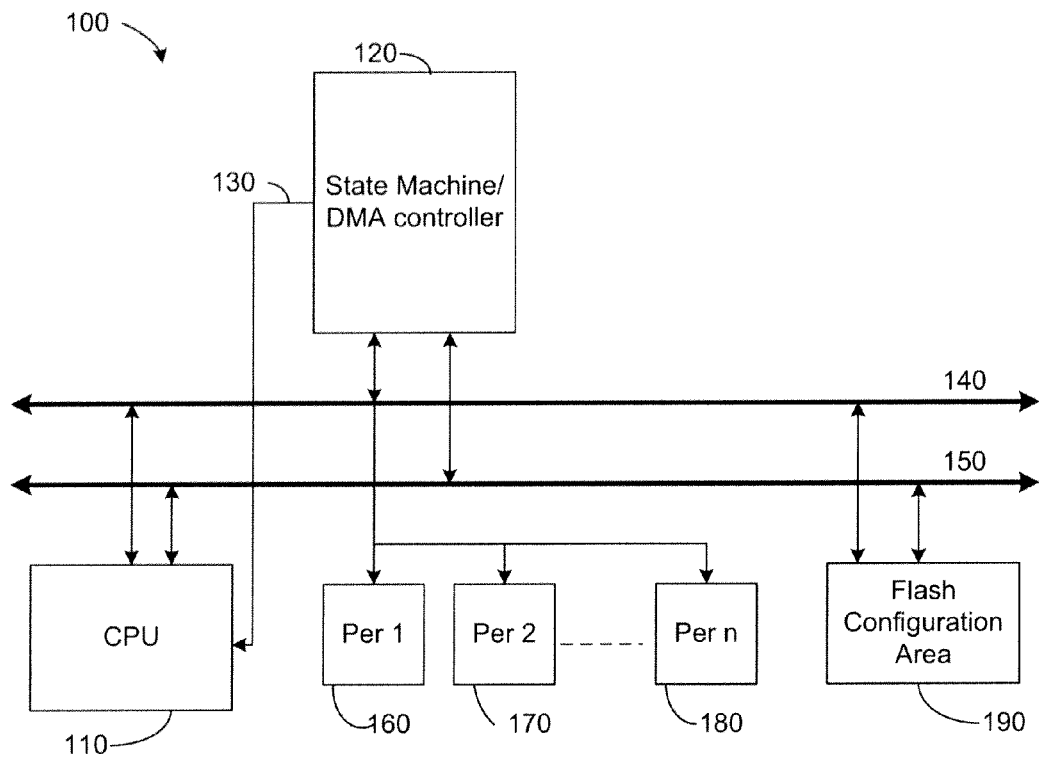
FIG. 1A is a block diagram showing the relevant parts of a first embodiment of a microcontroller.

FIG. 1A shows the relevant parts of an embodiment of a microcontroller comprising an automatic state configuration capability. A microcontroller 100 comprises a central processing unit (CPU) 110 which is coupled with a peripheral bus. The peripheral bus depicted in FIG. 1A shows only a data bus 140 and an address bus 150. However, a respective control bus may also be included in the peripheral bus. A plurality of peripherals 160, 170 . . . 180 is coupled to the peripheral bus 140, 150 to communicate with CPU 110. The microcontroller 100 furthermore comprises a state machine 120 and a Flash memory configuration area each coupled with the peripheral bus 140, 150. The state machine 120 may generate an interrupt signal 130 fed to CPU 110. The state machine may start operation through respective signals transferred from the CPU via bus 140, 150 and may generate an interrupt signal 130 and feed it to the CPU 110 once the operation of state machine 120 has been finished. However, other control signals may be used to start operation and signal the end of an operation.

Figure 1B:
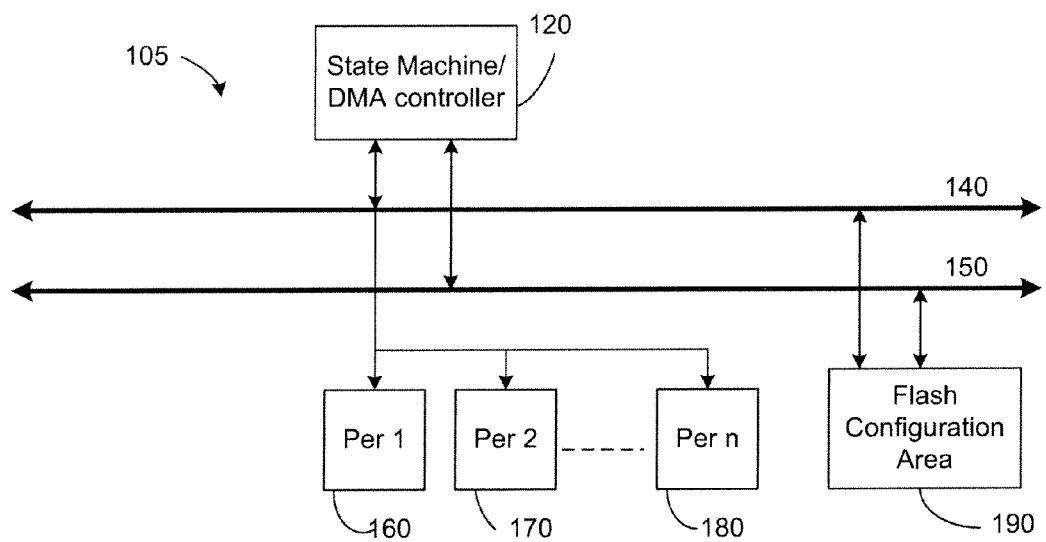
FIG. 1B is a block diagram showing the relevant parts of an embodiment of an integrated system.

FIG. 1B shows another embodiment representing an integrated system 105 with a plurality of peripheral devices 160, 170 . . . 180. This system is different from the above described microcontroller 100 in that it does not require a CPU to be integrated.

The integrated system 105 or microcontroller 100 according to various embodiments may operate in different ways. Initialization can be performed, for example, after a reset or after a sleep mode has been terminated. During a sleep mode, such as a so-called deep sleep mode, the system 105 or microcontroller 100 may be completely shut off or powered off except for certain function blocks, such as a real time clock, interrupt servicing logic, or some other timer function depending on the configuration or design of the system/microcontroller. Conventional systems or microcontrollers must re-initialize the entire microcontroller state per software. Conventional system without a CPU require an external controller or CPU to perform this task. This requires multiple cycles and static RAM usage to bring the microcontroller to exactly the state it had before entering the sleep mode. The initialization may require the setting of special function registers associated with respective peripherals, interrupt vector tables, etc.

According to one embodiment, all initialization values for various registers or memory areas of the peripherals or memory are preprogrammed into Flash configuration area 190. According to another embodiment, upon a first start of microcontroller 100 or system 105, it is checked whether Flash configuration area 190 has been programmed. If not, CPU 110 or in case of system 105 an external CPU may program this area with preset values defined by a user program. If Flash configuration area is programmed and contains valid data, the state machine 120 may be automatically started and perform initialization of all peripherals and/or memory according to the data stored in Flash configuration area 190. During operation of state machine 120, in case of microcontroller 100, CPU 110 may be allowed to perform other tasks that do not interfere with state machine 120 or may be halted until state machine 120 has finished the initialization process. Optionally, the CPU 110 can also be operational by fetching instructions as well by interleaving CPU accesses with accesses from the flash configuration area by the state machine 120.

During normal operation of microcontroller 100 or system 105, various registers and/or memory areas of the peripherals may require re-programming According to one embodiment, every time a peripheral is re-programmed, the CPU can also re-program the respective Flash configuration area 190. Thus, the Flash configuration area 190 is kept up to date and entering a sleep mode will not require to first save the current state of each peripheral. According to another embodiment, the state machine comprises two different operating modes. In a first operating mode, state machine 120 is operable to save all peripheral values into Flash configuration area 190 and in a second operating mode, state machine 120 is operable to restore all peripheral values from Flash configuration area 190. This mode would allow for a fast save and recovery operation during entering and leaving of a sleep-mode.

As shown in FIGS. 1A and 1B, according to another embodiment, the functions of the state machine 120 can be implemented by a DMA controller. Such a DMA controller requires little modification to operate as a dynamic state configuration restore tool. Generally, a simple DMA controller receives a source and destination address as well as a sequence of data to be transmitted to the destination address. Such a simple DMA controller needs very little modification, it merely requires an additional transfer mode in which the DMA controller reads out the Flash configuration area 190 which contains valid address and data pairs until a predetermined invalid address has been reached. During initialization, the DMA controller is started and transfers initialization data to all peripherals.

Figure 2:
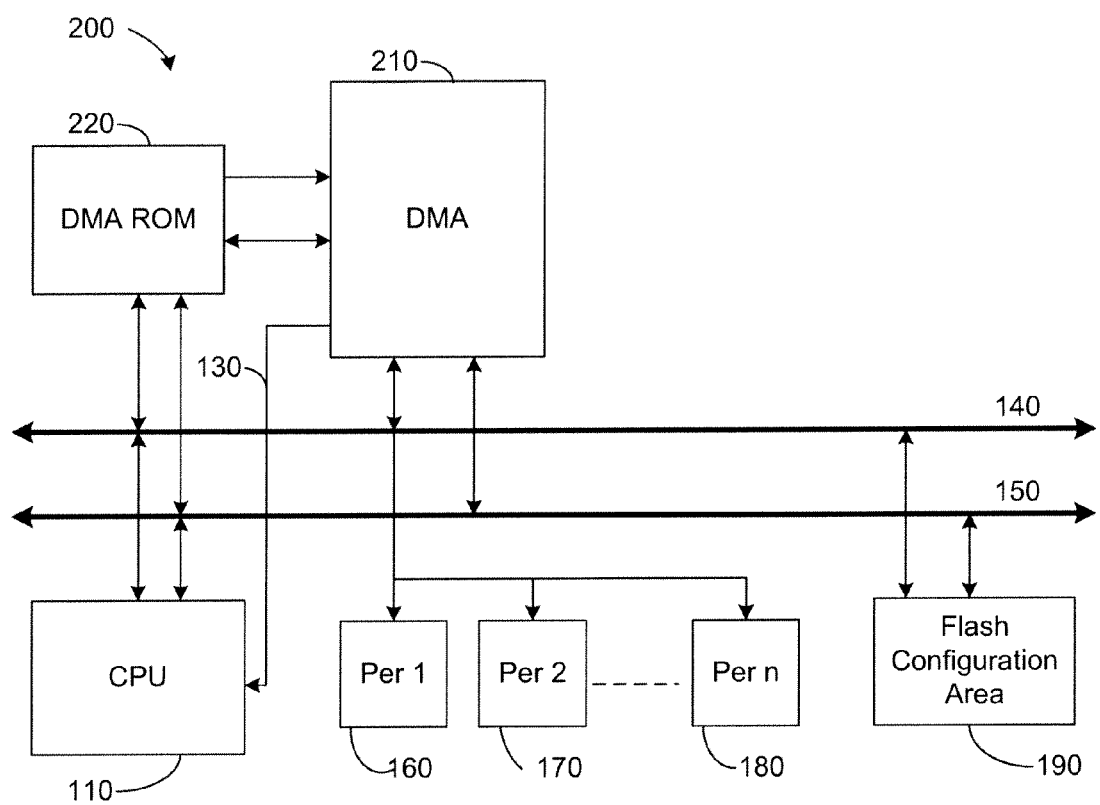
FIG. 2 is a block diagram showing the relevant parts of a second embodiment of a microcontroller.

FIG. 2 shows another embodiment, in which a programmable DMA controller 210 is used instead of a dedicated state machine or a simple DMA controller. To this end, microcontroller 200 has a dedicated DMA read only memory (ROM) 220 coupled with peripheral bus 140, 150 and programmable DMA controller 210. DMA controller 210 can be implemented as a small co-processor capable of executing a limited amount of instructions dedicated to direct memory access operations. Thus, an initialization process as described above can be implemented as a dedicated program in DMA ROM 220. This embodiment allows for different routines for example for start-up and sleep mode recovery. To this end, a dedicated Flash configuration area may contain a first storage area for reset values and a second storage area for sleep mode values. This embodiment can also be applied to the integrated system without an integrated CPU as shown in FIG. 1B.

Figure 4:
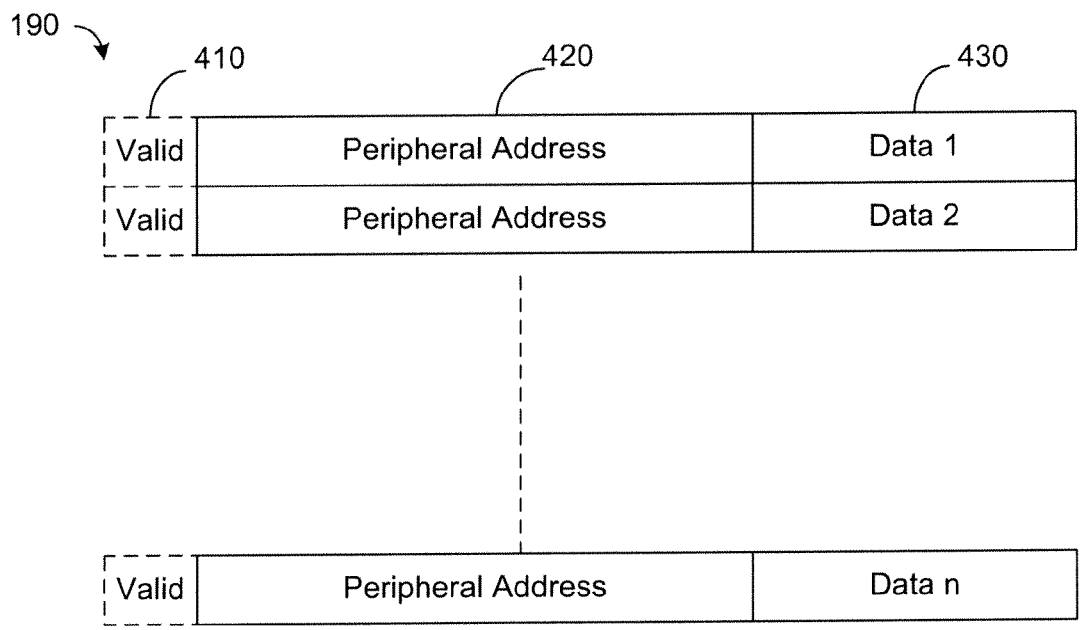
FIG. 4 shows a possible organization of a Flash Configuration area according to an embodiment.
Figure 5:
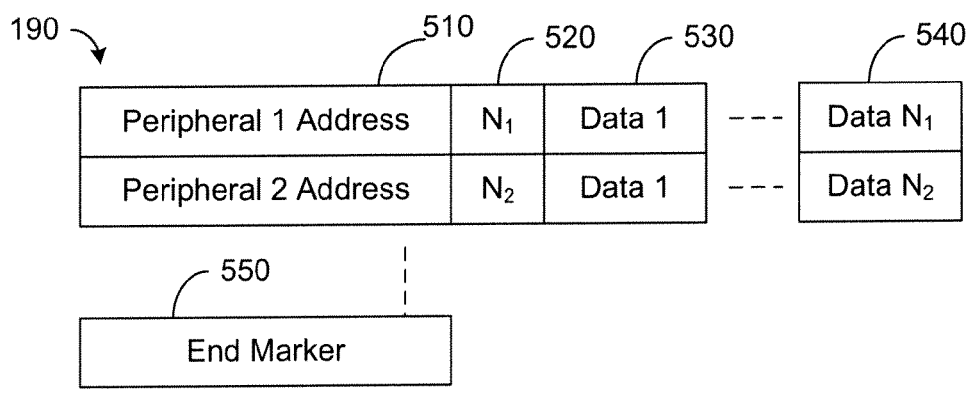
FIG. 5 shows another possible organization of a Flash Configuration area according to another embodiment.

Once the state machine 120 has been started, for example by the CPU or any other suitable means, a repetitive operation begins in which the state machine loads data from Flash configuration area 190 and writes these data into respective peripheral registers or peripheral memory area. FIGS. 4 and 5 show different Flash memory organizations. Flash memory configuration area 190 may be an area within a general Flash memory of the microcontroller. However, according to another embodiment, a dedicated Flash memory for initialization may be provided. The dedicated Flash memory may furthermore be coupled through the peripheral bus 140, 150 with state machine 120 or, according to another embodiment, may be coupled directly with the state machine 120. According to an embodiment, the Flash configuration area 190 may be treated like a boot block area or section of a Flash panel. Thus, it may have a fused-based address value which points to the start of the Flash configuration area. Thus, the configuration information could be stored in a section of the flash panel that the user has access to but for which the user does not necessarily want regular code access, such as a boot block area. Optionally, a fuse-based or flash-based register loaded at power on reset could be used to point to where the configuration data is kept, such that the state machine 120 starts up at any user-specified address.

The peripheral devices 160, 170 ... 180 may comprise one or more registers that contain respective control values which have to be saved and recovered during sleep or reset. In case a microcontroller or system comprises only such peripherals, the organization scheme as shown in FIG. 4 may apply. This Flash memory organization shows a possible data structure for the Flash configuration area 190. The memory 190 is organized in equally structured memory lines. Each line may comprise a valid bit 410, a peripheral register or memory address 420 and an associated register value 430. The state machine 120 only reads lines with a valid bit set. For those valid lines an address data pair is read and state machine 120 then addresses the respective peripheral or memory and writes the associated content 530 into the respective register or memory space. The Flash configuration area 190 may read the entire Flash configuration area 190 and use the valid bit to determine which address/data pairs will be used. However, according to another embodiment, this area may be programmed such that a valid bit is used to indicate the end of the valid entries. Then, the state machine does not have to go through the entire Flash memory. According to yet another embodiment, as indicated by the dotted valid boxes 410, no valid bit is used and instead peripheral address 420 is used to determine whether an address is valid or not. For example, a value of 00000000h or FFFFFFFFh may be used to indicate an invalid address or the end of the table and any other value would constitute a valid entry. Other values may apply depending on the bit size of the microcontroller.

Some peripherals or memory area may require a data sequence for initialization wherein the data sequence is written consecutively to the same address or in case of a memory area to consecutive addresses. FIG. 5 shows a Flash memory organization that allows for proper initialization of such structures. In this embodiment, each "memory line" is of variable length. Each line starts with an address 510 followed by a number entry 520 indicating the bytes/words 530-540 following the number entry 520. Thus, single register entries can be initialized by programming the respective register address of a peripheral in 510, setting N=1 followed by a single byte/word. A data sequence can be used by setting N>1. Another bit (not shown) could be used to indicate automatic address increment. The state machine decodes these entries and writes one or more bytes/words as programmed to the respective address or to respective consecutive addresses. Once all data associated with an address has been written, state machine 120 will read the next address until an address indicates the end of the table such as an address having the value 00000000h or FFFFFFFFh in a 32-bit address implementation.

Figure 3:
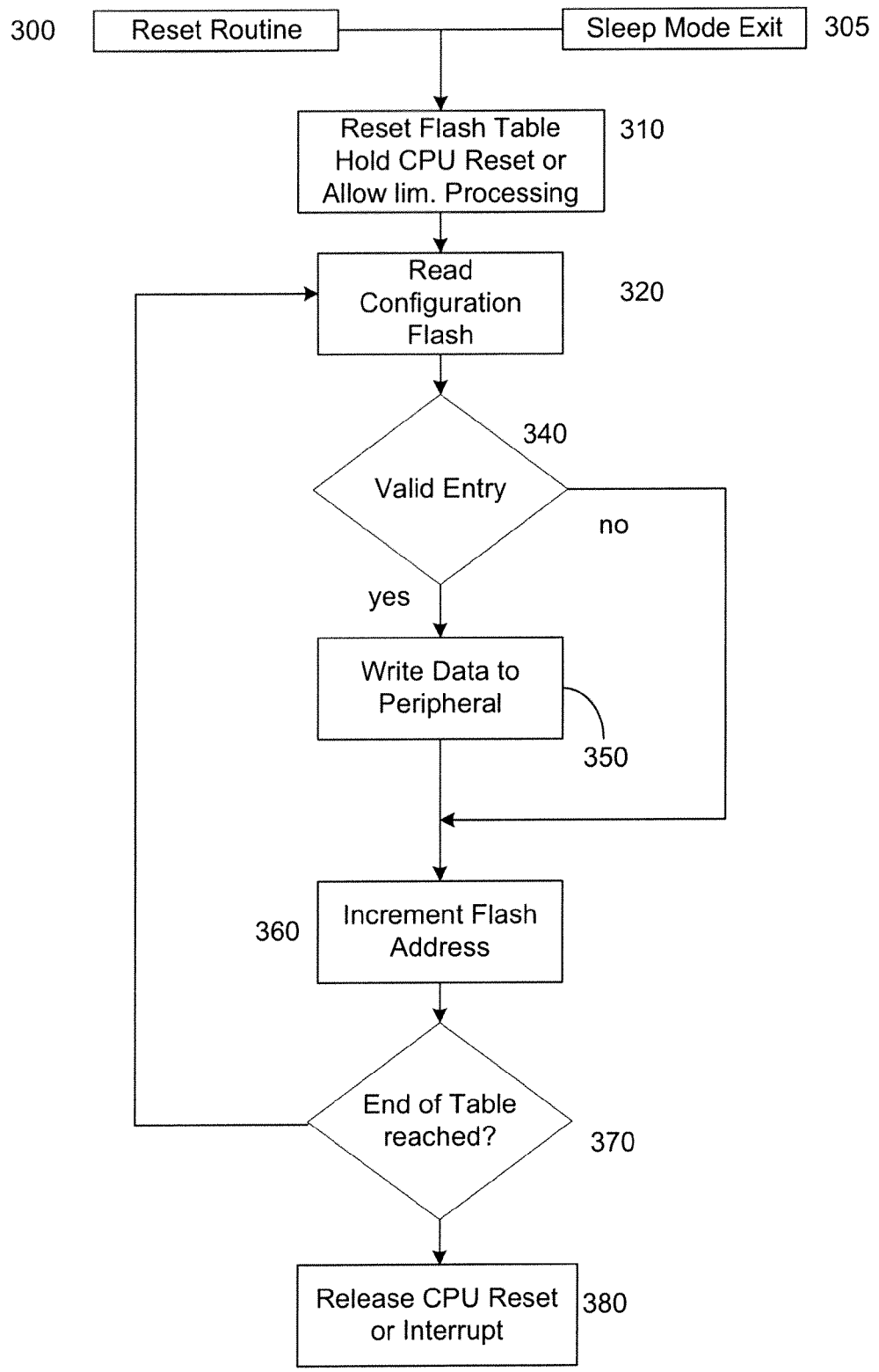
FIG. 3 shows a flow chart of a typical initialization operation according to an embodiment.

FIG. 3 shows a flow chart for a reset or sleep exit routine. This routine starts with step 300 or 305. Depending on the implementation, first, the Flash memory access address is reset and if applicable the CPU 110 is held in reset in step 310 or allowed to perform limited processing. For example, the CPU 110 may be allowed to perform any access that does not interfere with state machine 120. A user must, therefore, ensure that the CPU 110 stays within these boundaries until a proper signal from state machine 120 indicates the end of the initialization.

In step 320, the addressed entry in Flash configuration memory 190 is read and the address/data pair or address/data sequence pair is retrieved. The validity of this entry is tested in step 340. If valid, the data or data sequence is written to the peripheral address in step 350. If not or after executing step 350, the Flash address is incremented to the next entry. In step 370 it is checked whether the end of the initialization table is reached. If yes the routine ends in step 380 and generates an appropriate signal to CPU 110, such as an interrupt or releases CPU 110 from reset. If not, the state machine repeats steps 320-370 until the end of the table is reached.

What is claimed is:

1. An microcontroller comprising:
    a bus;
    a CPU coupled with said bus;
    a plurality of peripheral devices each one coupled with said bus, wherein each peripheral device comprises at least one configuration register controlling the functionality of the respective peripheral device;
    a non-volatile memory; and
    a state machine separate from said CPU and being coupled with said non-volatile memory and being operable to initialize said peripheral devices by reading initialization information from said non-volatile memory and writing it to said at least one configuration registers associated with said peripheral devices, wherein the state machine is operable to generate a signal to said CPU upon completion of initialization.

2. The microcontroller according to claim 1, wherein said non-volatile memory is a Flash memory coupled with said bus.

3. The microcontroller according to claim 1, wherein said initialization information comprises an address/data pair.

4. The microcontroller according to claim 1, wherein said initialization information comprises an address/data sequence pair.

5. The microcontroller according to claim 4, wherein said state machine is operable to write a plurality of data bytes/words to said address.

6. The microcontroller according to claim 1, wherein completion of initialization is detected by said state machine by an invalid address stored in said non-volatile memory.

7. The microcontroller according to claim 1, wherein completion of initialization is detected by said state machine by an invalid bit stored in said non-volatile memory.

8. The microcontroller according to claim 1, wherein said signal is an interrupt.

9. The microcontroller according to claim 1, wherein said signal releases said CPU from reset.

10. The microcontroller according to claim 1, wherein the state machine is implemented by a direct memory controller.

11. A method for initializing peripherals in a microcontroller comprising a central processing unit (CPU) and a memory, wherein each peripheral device comprises at least one configuration register controlling the functionality of the respective peripheral device, the method comprising the steps of:
    a) resetting a non-volatile memory address;
    b) reading an initialization information from the non-volatile memory address by a state machine being separate from said CPU;

c) determining validity of said initialization information;

d) if valid, initializing a peripheral associated with said initialization information, wherein the initialization information is written into the at least one configuration register of the peripheral, incrementing said non-volatile memory address; and e) repeating steps b)-d) until initialization has been completed, and f) generating a signal to the CPU upon completion of initialization.

12. The method according to claim 11, wherein said initialization information comprises an address/data pair.

13. The method according to claim 11, wherein said initialization information comprises an address/data sequence pair.

14. The method according to claim 12, wherein the step of initializing comprises writing a plurality of data bytes/words to said address.

15. The method according to claim 11, wherein completion of initialization is detected by said state machine by an invalid address stored.

16. The method according to claim 11, wherein completion of initialization is detected by said state machine by an invalid bit stored.

17. The method according to claim 11, wherein said signal is an interrupt.

18. The method according to claim 11, wherein said signal releases the CPU from reset.

19. The method according to claim 11, wherein said method is performed after exiting a sleep mode in which at least one peripheral is turned off.

20. The method according to claim 11, wherein the method is performed after a reset of said microcontroller.

21. An microcontroller comprising:

a bus;

a CPU coupled with said bus;

a plurality of peripheral devices each one coupled with said bus, wherein each peripheral device comprises at least one configuration register controlling the functionality of the respective peripheral device;

a non-volatile memory; and a state machine separate from said CPU and being coupled with said non-volatile memory and being operable to initialize said peripheral devices by reading initialization information from said non-volatile memory and writing it to said at least one configuration registers associated with said peripheral devices, wherein the state machine is operable to generate an interrupt signal and feed it to said CPU upon completion of initialization wherein completion of initialization is detected by said state machine by an invalid address or an invalid bit stored in said non-volatile memory.

* * * * *